US006752926B2

(12) United States Patent
Christodoulatos et al.

(10) Patent No.: US 6,752,926 B2
(45) Date of Patent: Jun. 22, 2004

(54) METHOD AND APPARATUS FOR TREATMENT OF WASTEWATER

(75) Inventors: Christos Christodoulatos, Somerset, NJ (US); George P. Korfiatis, Basking Ridge, NJ (US)

(73) Assignee: Trustees of Stevens Institute of Technology, Hoboken, NJ (US)

( * ) Notice: Subject to any disclaimer, the term of this patent is extended or adjusted under 35 U.S.C. 154(b) by 3 days.

(21) Appl. No.: 10/046,345

(22) Filed: Oct. 19, 2001

(65) Prior Publication Data

US 2002/0158012 A1 Oct. 31, 2002

Related U.S. Application Data (60) Provisional application No. 60/242,158, filed on Oct. 20, 2000.

(51) Int. Cl.[7] .................................................. C02F 3/06
(52) U.S. Cl. ...................... 210/617; 210/621; 210/150; 210/195.1; 210/195.2
(58) Field of Search ................................ 210/617, 620, 210/621, 622, 150, 151, 194, 195.1, 195.2

(56) References Cited

U.S. PATENT DOCUMENTS

| | | | | |
|---|---|---|---|---|
| 3,269,542 A | * | 8/1966 | Renzi et al. ................. 210/151 |
| 4,192,742 A | | 3/1980 | Bernard et al. ................ 210/17 |
| 4,416,993 A | * | 11/1983 | McKeown .................... 210/620 |
| 4,861,471 A | * | 8/1989 | Nakao et al. ............. 210/175.3 |
| 5,151,187 A | * | 9/1992 | Behmann .................... 210/151 |
| 5,271,830 A | * | 12/1993 | Faivre et al. ................ 210/151 |
| 5,316,682 A | * | 5/1994 | Keyser et al. ........... 210/195.2 |
| 5,403,487 A | | 4/1995 | Lodaya et al. ............... 210/610 |
| 5,463,176 A | | 10/1995 | Eckert ......................... 210/622 |
| 5,534,143 A | | 7/1996 | Portier et al. |
| 5,543,039 A | | 8/1996 | Odegaard .................... 210/150 |
| 5,543,143 A | | 8/1996 | Reed ........................ 424/130.1 |
| 5,686,304 A | | 11/1997 | Codner ....................... 435/325 |
| 5,800,709 A | * | 9/1998 | Smith .......................... 210/151 |
| 5,955,353 A | | 9/1999 | Amiot |
| 5,997,736 A | | 12/1999 | Sumino et al. ............. 210/151 |
| 6,007,712 A | * | 12/1999 | Tanaka et al. .............. 210/151 |
| 6,132,602 A | | 10/2000 | Luehr ......................... 210/150 |

OTHER PUBLICATIONS

A.E. Drysdale, et al., "A More Completely Defined CELSS", SAE Paper 941292, 24th International Conference on Environmental Systems and 5th European Symposium on Space Environmental Control System, Friedrichshafen, Germany, (Jun. 20–23, 1994), pp. 1–12.

G.P. Miller, et al., "Further Applications of the Use of Biological Reactors to Remove Trace Hydrocarbon Contaminants from Recycled Water", SAE Paper 921273, 22nd International Conference on Environmental Systems, Seattle, (Jul. 13–16, 1992), pp. 1–7.

(List continued on next page.)

Primary Examiner—Christopher Upton
(74) Attorney, Agent, or Firm—McCarter & English, LLP (57) ABSTRACT

A closed bioreactor for high organic carbon removal and ammonia conversion in high-strength wastes under microgravity conditions. Oxygen is provided to the bioreactor by diffusion through a non-porous hydrophobic membrane in a recirculation line, allowing a high rate of oxygen transfer while minimizing the opportunity for formation of bubbles. Operating the bioreactor as a closed unit at elevated pressures keeps the oxygen in the dissolved phase. The oxygen transfer within the reactor is thus much more efficient and uniform than in similar reactors having both a liquid and gaseous phase.

22 Claims, 3 Drawing Sheets

OTHER PUBLICATIONS

G.P. Miller, et al., "Using Biological Reactors to Remove Trace Hydrocarbon Contaminants from Recycled Water", SAE Paper 911504, 21$^{st}$ International Conference on Environmental Systems, San Francisco, (Jul. 15–18, 1991), pp. 99–107.

M. S. Nacheff–Benedict, et al., "An Integrated Approach to Bioreactor Technology Development for Regenerative Life Support Primary Water Processor", SAE Paper 941397, 24$^{th}$ International Conference on Environmental Systems and 5$^{th}$ European Symposium on Space Environmental Control System, Friedrichshafen, Germany, (Jun. 20–23, 1994), pp. 1–14.

G. E. Petrie, et al., "Development of Immobilized Cell Bioreactor Technology For Water Reclamation in a Regenerative Life Support System", SAE Paper 911503, 21$^{st}$ International Conference on Environmental Systems, San Francisco, (Jul. 15–18, 1991), pp. 179–191.

G. E. Petrie, et al, "Immobilized Cell Bioreactors for Water Reclamation: Process Stability and Effect of Reactor Design", SAE Paper 921227, 22$^{nd}$ International Conference on Environmental Systems, Seattle, (Jul. 13–16, 1992), pp. 1–10.

C.E. Vertosko, et al., "A Hybrid Regenerative Water Recovery System For Lunar/Mars Life Support Applications", SAE Paper 921276, 22$^{nd}$ International Conference on Environmental Systems, Seattle (Jul. 13–16, 1992), pp. 1–8.

T. Wydeven, et al., "Generation Rates and Chemical Composition of Waste Streams in a Typical Crewed Space Habitat", NASA Technical Memorandum 102799, Ames Research Center, (1990), pp. 1–25.

* cited by examiner

METHOD AND APPARATUS FOR TREATMENT OF WASTEWATER

INTRODUCTION

This application claims the benefit of priority from U.S. provisional application Ser. No. 60/242,158, filed Oct. 20, 2000.

BACKGROUND OF THE INVENTION

Biochemical oxidation of carbonaceous and nitrogenous substrates, in aqueous waste streams, is typically mediated by microorganisms capable of catalyzing the oxidative processes under conditions ranging from strict aerobiosis to strict anaerobiosis. The selection of the specific process environment depends on the nature of the substrates, their concentration and treatment objectives. High strength wastewater is characterized by high substrate concentrations, as measured by the chemical oxygen demand (COD) or the five-day biochemical oxygen demand (BOD5), and high nitrogen content, as measured by ammonia-, nitrite- or nitrate-nitrogen. Conversion of BOD5 to carbon dioxide and water, and transformation of ammonia to nitrite and nitrate in a process termed nitrification, requires a supply of oxygen sufficiently high to satisfy the stoichiometric requirements of these processes.

Biological processing of high strength wastewater in terrestrial or space environments presents serious challenges, stemming mainly from mass transfer limitations of substrate and oxygen. Further, a major issue in space applications is the absence of gravity which introduces problems associated with separation between solid-liquid and liquid-gas phases.

Immobilized, cell packed bed bioreactors (ICPB) have been used extensively for the treatment of wastewater on earth and can provide solutions to problems associated with microgravity. Conceptual models of advanced life support (ALS) integrated systems design mandate approximately 100% closure with respect to the water loop Drysdale A. E., et al., "A More Completely Defined CELSS", SAE Paper 941292, 24th International Conference on Environmental Systems and 5th European Symposium on Space Environmental Control System, Friedrichshafen, Germany, Jun. 20–23, 1994.). Water reclamation from various aqueous streams and reuse is thus imperative. Water rich liquid streams in space/space vehicle habitats include washwater, utility water (food preparation, laundry), urine and condensate water. Mixtures of the first two streams (washwater, utility water) are commonly termed greywater. Estimated quantities of urine and greywater vary in the range of between 1.3–2.1 liters of urine waste and 20–30 liters of greywater waste per person per day. (Wieland P. O., "Designing for Human Presence in Space: An Introduction to Environmental Control and Life Support Systems", NASA Reference Publication 1324, 1994.; Wydeven T. and Golub M. A., "Generation Rates and Chemical Composition of Waste Streams in a Typical Crewed Space Habitat", NASA Technical Memorandum 102799, Ames Research Center, 1990). With the exception of condensate water which is low in organic content, the other liquid streams contain varying amounts of organic loads and require treatment prior to any possible reuse. Various reuse scenarios include utilization of the reclaimed water as hydroponic solution water, utility water, or potable water. Evidently, each of these reuse scenarios dictates and sets the desired treatment objectives. These objectives include, but are not limited to: organic carbon removal, nutrient reclamation and reuse in hydroponic solutions, and water reclamation. Essentially the first two objectives can be summarized as carbon oxidation and nitrification. Research conducted over the last ten years has shown that biological processes for treatment of urine, condensate, and grey water combined streams have a demonstrated potential for use as a primary water processor (Petrie G. E., et al., "Development of Immobilized Cell Bioreactor Technology for Water Reclamation in a Regenerative Life Support System", SAE Paper 911503, 21st International Conference on Environmental Systems, San Francisco, Jul. 15–18, 1991; Petrie G. E., et al., "Immobilized Cell Bioreactors for Water Reclamation: Process Stability and Effect of Reactor Design", SAE Paper 921227, 22nd International Conference on Environmental Systems, Seattle, Jul. 13–16, 1992.) or a trace polisher in an integrated bioregenerative life support water recovery system (Miller G. P. et al., "Further Applications of the Use of Biological Reactors to Remove Trace Hydrocarbon Contaminants from Recycled Water", SAE Paper 921273, 22nd International Conference on Environmental Systems, Seattle, Jul. 13–16, 1992; Miller G. P. et al., "Using Biological Reactors to Remove Trace Hydrocarbon Contaminants from Recycled Water", SAE Paper 911504, 21st International Conference on Environmental Systems, San Francisco, Jul. 15–18, 1991). Because of the well established performance reliability, small energy and volumetric requirements, various configurations of immobilized cell bioreactors have been preferred over their suspended growth counterparts. Collaborative work performed by NASA and aerospace contractors has focused on immobilized cell bioreactors operating as plastic media packed beds. Two-stage packed bed bioreactors containing porous and non-porous plastic media accomplishing carbon oxidation in the first stage and nitrification in the second were initially studied (Verostko C. E., et al., "A Hybrid Regenerative Water Recovery System for Lunar/Mars Life Support Applications", SAE Paper 921276, , 22nd International Conference on Environmental Systems, Seattle, Jul. 13–16, 1992). The performance of these reactors with respect to both chemical oxygen demand (COD), and urea degradation at hydraulic retention times (HRT) in the range of 24–48 hr was satisfactory (greater than 97% and 99%, respectively) but decreased significantly for HRTs in the range of 12–24 hr (65% and 91%, respectively) (Petrie G. E., et al., "Immobilized Cell Bioreactors for Water Reclamation: Process Stability and Effect of Reactor Design", SAE Paper 921227, 22nd International Conference on Environmental Systems, Seattle, Jul. 13–16, 1992). An immobilized cell bioreactor (ICB) essentially consisting of a foam covered plate reactor was also studied in parallel. The parallel plate reactor performance was over 95% and 99% total organic carbon (TOC) and urea reduction for all HRTs in the range of 12–24 hours. Full-scale experiments for both bioreactor types verified previous findings (Nacheff-Benedict M. S. et al., "An Integrated Approach to Bioreactor Technology Development for Regenerative Life Support Primary Water Processor", SAE Paper 941397, 24th International Conference on Environmental Systems and 5th European Symposium on Space Environmental Control System, Friedrichshafen, Germany, Jun. 20–23, 1994).

Immobilized cell bioreactors with packed or fluidized bed, provide a unique environment for microbial growth resulting in high biomass concentrations. Packing materials commonly used include ceramic saddles, stainless steel wire spheres, polypropylene toroids, reticulated polyester foams, matted reticulated polypropylene sheets, polypropylene strands and sand. The main features of immobilized cell bioreactors are the support media for microbial attachment with larger surface area which are better for conversion efficiency; the absence of a microbial wash-out flow-rate, and the elimination of the need for concentrated biomass recycle from a clarifier. The advantages of these reactor configurations over conventional, completely stirred tank reactors (CSTR) systems for organic removal and nitrification/denitrification are well established. Biomass concentrations as high as 5–40 g/L of reactor volume have been reported when using solid support particles (Cooper, R. F. and B. Atkinson. Editors of: Biological Fluidized Bed Treatment of Water and Wastewater. Ellis Horwood Limited Publishers, 1981). High biomass concentrations greatly enhance process efficiency resulting in substantial reductions in treatment time and reactor volume. ICBPs can operate both in aerobic and oxygen limiting modes. A major problem with the operation of such aerobic reactors is oxygen distribution and gaseous by-product formation. Phase separation in packed beds under microgravity conditions, has been a major problem.

Greywater generated in closed environments such as a space station, a space vehicle or a submarine contains high concentrations of biodegradable carbon compounds and nitrogen in the form of various amino acids and urea. Liquid wastes generated from various farming activities also have high levels of carbon and nitrogen and are difficult to treat by conventional aerobic processes. For instance, liquid swine wastes are characterized by high BOD5 and COD strengths. This high strength wastewater exerts a high oxygen demand on the treatment system if complete conversion to innocuous products is to be realized. Typical concentrations of carbon and nitrogen in greywater are in excess of 800 mg/L BOD5, and 500 mg/L of ammonia-nitrogen($NH_3$-N), respectively. These concentrations are substantially higher than the corresponding BOD5 and ammonia concentrations observed in municipal wastewater. Conventional attached growth systems such as trickling filters and packed bed bioreactors, operating at atmospheric conditions, cannot effectively cope with the mass transfer demands, in terms of substrate and oxygen, that are required for efficient treatment of high strength wastewater. In addition, these systems operate in a three phase mode meaning that the solid, liquid and gaseous phases coexist in the packed bed bioreactor unit, which makes phase contact and separation impossible under microgravity conditions. Most biological processes currently in operation require a solid-liquid separator after the bioreactor, in order to separate the biomass from the treated effluent prior to discharge.

U.S. Pat. Nos. 5,403,487, 5,463,176, 5,543,039, 5,686,304, and 6,132,602 describe various approaches which enhance oxygen transfer and process performance in attached growth packed bed bioreactors. U.S. Pat. No. 5,543,143 describes generation of microbubbles for enhanced oxygen transfer. U.S. Pat. No. 5,997,736 describes nitrogen conversion by specific microorganisms. U.S. Pat. No 4,192,742 describes a system wherein wastewater is passed through a pressurization tank and a gas tight biological filter bed. The liquid in the first tank comes into direct contact with an oxygen-containing gaseous phase above it. The oxygenated wastewater is then introduced to the biological filter, which also operates under pressure, and is subsequently discharged to the environment. Both the oxygenation tank and the biological filter operate with a gaseous headspace, thus forming a two-phase system, which makes them unsuitable for microgravity operation. Moreover, the single-pass of the wastewater through the biological filter limits the performance of the system for the treatment of high strength streams. Another limitation of this system is that oxygen exchange occurs through the interface of the liquid and gas phases which is fixed by the dimension of the chamber.

Another method widely used in the biological treatment of wastewater by attached growth bioreactors, is the recycling of a portion of the effluent to a point upstream of the oxygenation device. This approach also enhances oxygen transfer and improves the overall performance of the system, but becomes uneconomical for the treatment of large volumes of wastewater when the operation is carried out using air at atmospheric pressure. Further, this approach suffers from similar limitations to pressurized two-phase systems during treatment of high strength streams and in the absence of gravity.

Therefore, there is a need for an improved biological method and apparatus for treatment of high strength wastewater in terrestrial and microgravity environments.

SUMMARY OF THE INVENTION

An object of the present invention is to provide an apparatus for wastewater treatment comprising at least one immobilized cell packed bed bioreactor, and at least one membrane oxygenation module attached to an external recirculation line.

Another object of the present invention is to provide a system for treating wastewater comprising at least one immobilized cell packed bed bioreactor, and at least one membrane oxygenation module attached to an external recirculation line.

A further object of the present invention is to provide a method of treating wastewater containing organic carbon and ammonia using the apparatus of the present invention by removing organic carbon and nitrifying high strength wastewater.

DESCRIPTION OF THE DRAWINGS

FIG. 2 shows the membrane oxygenation module. The module is made up of an oxygen supply line (10), a gas effluent section (12), a wastewater inlet (14), an oxygenated wastewater outlet (16) and membrane fibers (18).

DETAILED DESCRIPTION

The present invention relates to both carbon removal and nitrification in wastewater or greywaters. Various attached growth biological reactor configurations have been used over the years for carbon and ammonia conversion. In terms of oxygenation these systems fall into two categories, those that provide oxygen through diffusers mounted in the bottom of the bioreactor and those that provide aeration by maintaining pressures higher than atmospheric in the system, thus increasing the DO concentration. In both cases oxygen is transported through direct contact between the oxygen rich gas phase and the wastewater.

Figure 1:
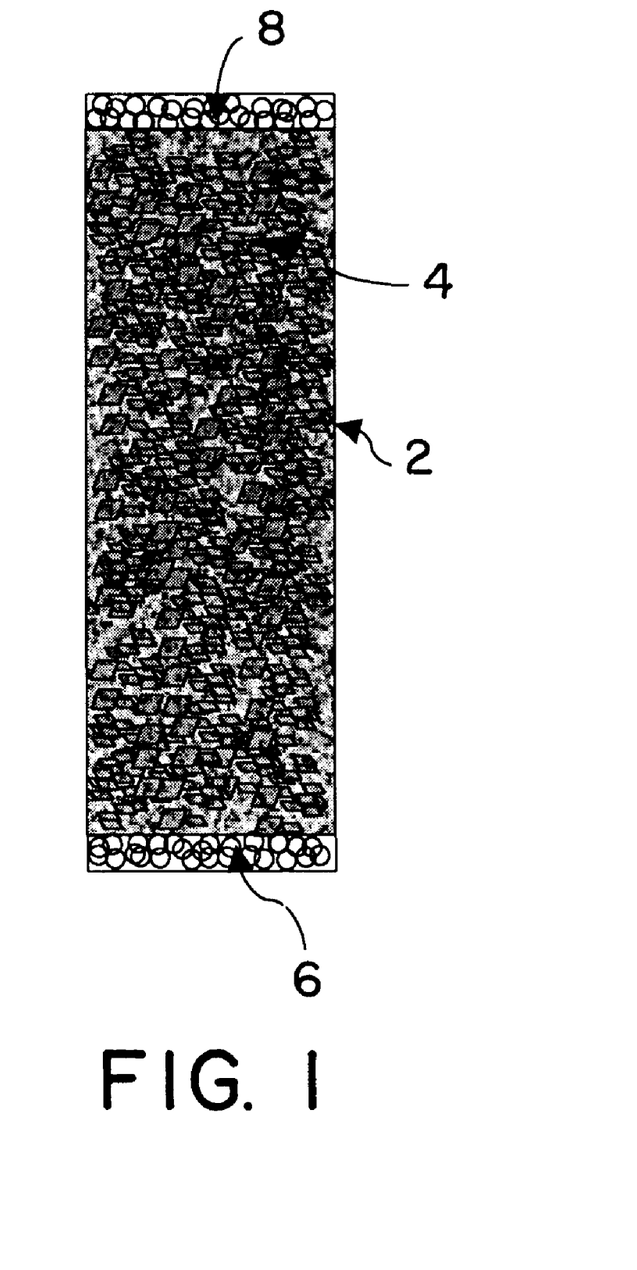
FIG. 1 depicts the immobilized cell packed bed bioreactor which comprises a column (2) which holds bioreactor packing material (4). The column (2) has an influent flow distribution section (6) and an effluent redistribution section (8).
Figure 2:
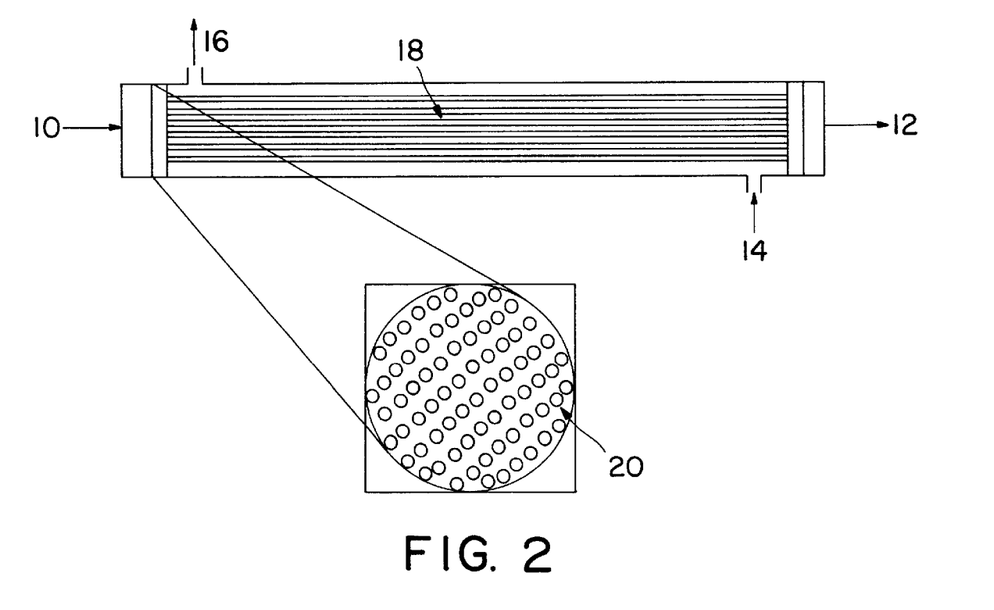

The greywater treatment apparatus of the present invention comprises an immobilized cell packed bed bioreactor, and a membrane oxygenation module attached to an external recirculation line. The immobilized cell packed bed bioreactor as shown in FIG. 1, comprises a column (2) which holds bioreactor packing material (4). The bioreactor packing material is preferably plastic flakes. However, any other material (ceramic, stainless steel, etc.) structured or random may be used depending on the particular application. The column (2) has an influent flow distribution section (6) and an effluent flow redistribution section (8). The immobilized cell packed bed bioreactor of the present invention is capable of processing greywater, under microgravity conditions, and can operate at elevated DO concentrations without direct contact between the gaseous and liquid phases. The membrane oxygenation module as shown in FIG. 2, has a shell side and a lumen side. The membrane oxygenation module is made up of an oxygen supply line (10), a gas effluent section (12), a wastewater inlet to shell side (14), an oxygenated wastewater outlet (16), and membrane fibers (18). The membrane fibers (18) are present preferably in the form of a membrane fiber bundle. External recirculation provides mixing in the packed section of the column. Oxygen is supplied by the membrane module and is transported to the packed bed by continuous recirculation of the liquid. The advantage of using a membrane for oxygenation is that the two phases are separated. Such phase separation is required for microgravity operation. The membrane also provides a large surface area for oxygen exchange. In one aspect the present invention provides an apparatus for the removal of BOD5 and nitrogen from greywater in terrestrial and space environments under microgravity, hypogravity, or hypergravity conditions. In another aspect, the apparatus of the present invention improves the performance of the packed bed bioreactors during the treatment of high strength wastewater by enhancing substrate and oxygen mass transfer in the bioreactor, and increasing the DO concentration by operating at pressures higher than atmospheric pressure. In another aspect, the apparatus of the present invention eliminates the need for a clarification unit following the biological reactor and produces a high clarity effluent. The apparatus of the present invention can be used to conduct either BOD5 removal or conversion of ammonia in two identical but separate systems or can be designed to operate as a two-stage, single process system. In the single process, the packed bed of the bioreactor is partitioned into two sections, a BOD5 removal section followed by a nitrification section. The separation of the two processes is necessary in order to ensure sufficient biomass of the autotrophic nitrifying microorganisms, which have substantially lower growth rates than the carbon degrading heterotrophs. Each section may have its own oxygenation module or a common oxygenation module can be used depending on the carbonaceous and nitrogenous BOD5 of the wastewater. The bioreactor housing the packed bed is fully saturated with the liquid to be treated. Neither the bioreactor nor the oxygenation module allow the liquid and the gaseous streams to come into direct contact with each other. Oxygen transfer occurs through the walls of a membrane which otherwise prevents mixing and direct contact of the two phases.

The conversion of carbon-containing biodegradable substances to carbon dioxide and water proceeds through a series of mass transfer processes and biochemical reactions. The carbon substrates are transferred near the surface of the biofilm from the bulk of the liquid by diffusion processes and subsequently, by overcoming a series of resistances, they are carried inside the biofilm where biodegradation takes place. Similar transport mechanisms are applicable to the oxygen transfer from the dissolution or dissolving phase to the microbial cells in the biofilm. The oxidation of carbon substrates results in the production of carbon dioxide, water, new biomass and the release of energy.

Nitrification, the conversion of organic nitrogen to nitrite and nitrate proceeds via two distinct steps. The first stage of nitrification is the formation of nitrites by the bacterial genera Nitrosomonas, the second stage, is the work of the bacterial genera Nitrobacter. The overall conversion scheme can be represented by the chemical reaction $NH_3 + 2O_2 \rightarrow NO_3^- + 2H^+ + H_2O$ where the final products are nitrate, hydronium ions and water. This reaction is favored in low BOD5 environments which allow sufficient growth of the autotrophic nitrifiers.

Figure 3:
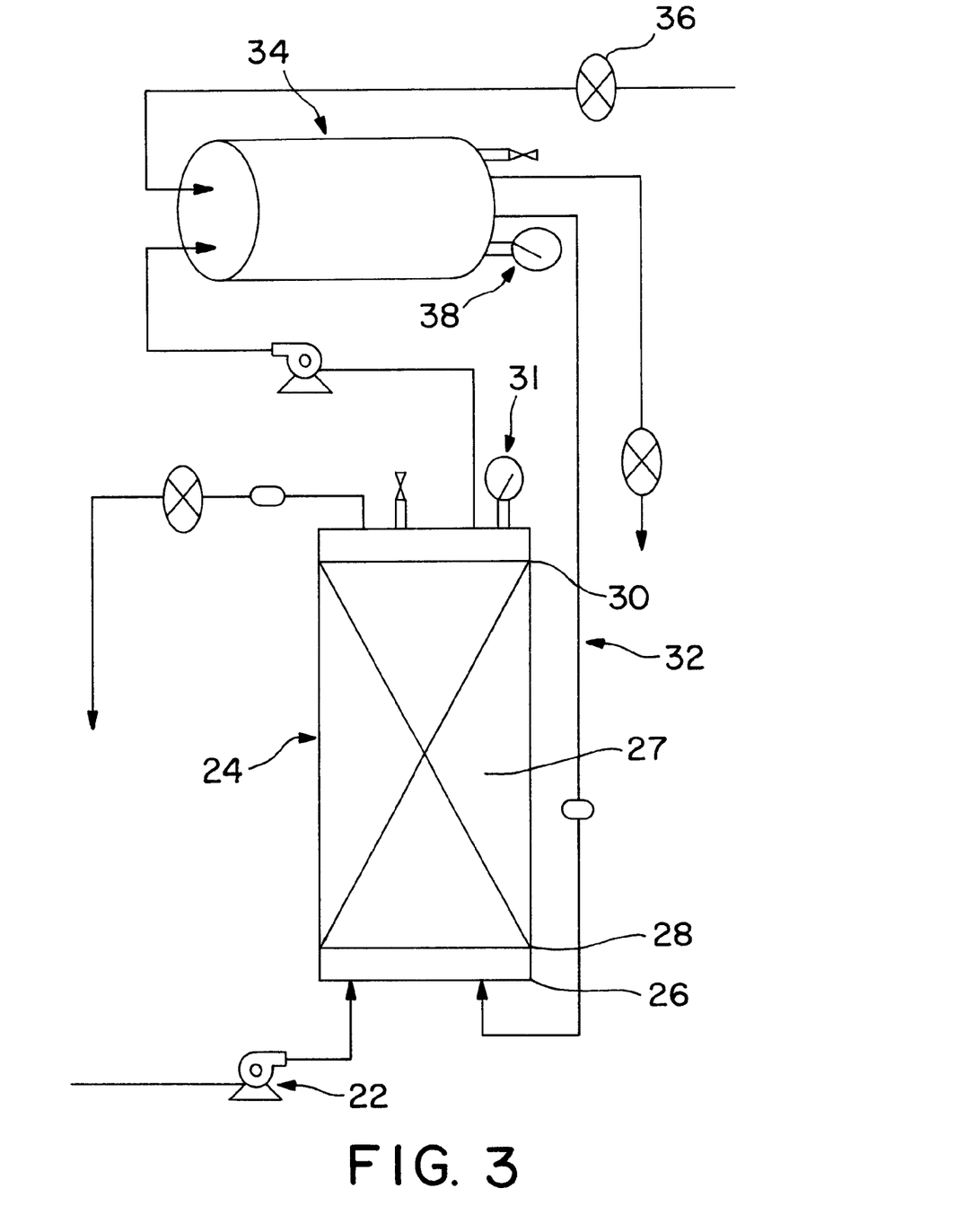
FIG. 3 is a process diagram showing how influent wastewater is fed into a feed pump (22) which then pumps the wastewater into the bottom of the packed bed bioreactor (24). A water distributor (26) receives the influent wastewater and distributes it equally around the column.

In another embodiment, the present invention provides a treatment system of low energy requirements and small footprint. Low energy requirements and a small footprint are desired attributes for many applications but are especially important in closed systems such as a space station, space craft, or a submarine where space availability and utilization are major concerns. The system for treating wastewater is made up of at least one immobilized cell packed bed bioreactor, and at least one membrane oxygenation module attached to an external recirculation line. The immobilized cell packed bed bioreactor operates under fully saturated conditions, without gaseous headspace, and is capable of achieving high organic carbon removal and ammonia conversion. The reactor can be staged to carry out both carbon removal and nitrification in the same unit. The wastewater containing both BOD5 and ammonia is introduced to the carbon removal section of the reactor and then the wastewater flows into the nitrification section where ammonia is converted to nitrite and nitrate. The packed volume of each section need not be equal, but it will be determined by the required reduction efficiencies of the carbon and ammonia. Each section may have its own oxygenation module or both processes may share the same oxygenator, depending on the strength of the wastewater and treatment goals. The closed system operating above atmospheric pressure keeps oxygen in the dissolved phase and enhances oxygen availability within the packed bed. The oxygen transfer in the reactor is more efficient and uniform than reactors operating in two phases e.g., liquid and gaseous. The system of the present invention maintains aerobic conditions while the bioreactor operates in the absence of the gaseous phase or formation of gas bubbles. The system of the present invention eliminates the need for solid-liquid separation after carbon or ammonia conversion in the bioreactor due to the very low sludge production. The system of the present invention produces a clarified effluent with low suspended solids. Oxygen transfer is achieved outside the packed bed bioreactor through an oxygen selective membrane module attached to an external recirculation line. The feed gas to the membrane module can be either oxygen or air. The system with the oxygen selective membrane transfer module can be operated aerobically under zero gravity conditions. By achieving high oxygen concentrations, the pressurized system requires a smaller footprint area than ambient pressure systems for the same removal efficiency, making it more compact and more economical As shown in FIG. 3, influent wastewater is fed into a feed pump (22) with sufficient power to overcome the operating pressure head of the system. The feed pump then pumps the wastewater into the bottom of the packed bed bioreactor (24). A water distributor (26) mounted to the bottom of the cylindrical bioreactor below the packed bed, receives the influent wastewater and distributes it equally around the cross-sectional area of the column. Above the water distributor a first perforated plate (28) is fixed on the reactor body and on it the packing material (27) is placed. Once the reactor is packed to the desired height, a second perforated plate (30) is fixed at the top end of the packing material (27). These two plates hold the packing in place and prevent its movement during operation. If necessary, a layer of coarse material such as gravel or spherical plastic or glass beads may be placed between the packed bed and the bottom and top ends of the reactor to assist in the proper distribution of the flow. The volume, and consequently the height or depth of the packed bed, depend on the nature of the packing, the volumetric flow rate and the composition of the wastewater, and the specified treatment goals. The dimensions of the packed bed can be determined by conducting pilot scale treatability studies with the actual wastewater.

In a preferred embodiment, the packing material used in the system is plastic flakes. The plastic flakes may be obtained from soda bottles, for example. Such plastic flakes are light and provide a suitable surface for microbial attachment. However, any other material (ceramic, stainless steel, etc.), structured or random, may be used depending on the particular application. The packing material can be structured or random provided it is inert and facilitates microbial attachment. Microbes grow on the packing surface until the desired biofilm thickness is achieved and a pseudo-steady-state is attained. If nitrification is carried out and the wastewater contains low amounts of alkalinity, slow releasing alkalinity compounds such as marble chips may be incorporated into the packing. An external recirculation line (32) connected to the effluent end of the packed bed bioreactor withdraws liquid and transports it to the membrane module (34). Recirculation water flows through the oxygenation module in the shell side and comes into contact with the tube side of the membrane. In the lumen side of the membrane pure oxygen or air is maintained at a selected pressure through a pressure regulator (36). An oxygenation module pressure gauge (38) may be used to monitor the pressure. If pure oxygen is used for water oxygenation, gas flow through the membrane lumen is not required. However, when air is used the module must operate in a flow through mode in the lumen side in order to maintain the desired oxygen partial pressure. A differential pressure is maintained across the membrane wall which drives the gas transfer. The chemical potential of oxygen that develops across the membrane wall between the gas and liquid phases results in oxygen diffusion through the membrane and its subsequent transfer by the recirculated water into the packed section of the column. If pure oxygen is utilized, the system operating pressure need not be higher than atmospheric. Recirculation serves two main functions namely, it enriches the reactor with oxygen and provides mixing within the packed section which introduces turbulence and facilitates substrate transport to the biofilm surface. The separation of the liquid and gas phases by the membrane in the oxygenation module and full saturation and absence of a gaseous phase in the packed bed make the system gravity independent. Oxygen is kept dissolved in the wastewater at all times due to the applied liquid pressure. The recirculation ratio, that is the ratio of the recycle flow rate and the influent flow rate, and the differential pressure across the membrane can be controlled to satisfy the oxygen requirements of the system. The treated water is discharged through the effluent line to the receiving environment. In the case that both carbon treatment and nitrification are required, the low BOD5 effluent from the carbon removal unit becomes the influent to the nitrification reactor which is operated similarly but may require a different hydraulic retention time to achieve the treatment goals.

For a given packing type and bed volume, the hydraulic retention time (HRT) required to achieve a certain removal efficiency depends on the volumetric flow rate of the wastewater. High strength waste streams require longer residence times or larger bioreactor packed volume. Oxygen is depleted in the bioreactor due to biochemical oxidation. Water with low DO concentrations is passed through the oxygenation module (34) where it is enriched with oxygen and returned to the packed bed through an external recirculation line (32). The oxygenation module (34) is attached on the recirculation line. A liquid inlet and outlet in the shell side of the oxygen selective membrane accommodates the passage of the wastewater to be oxygenated. A gas inlet and outlet facilitates flow of the oxygen-carrying gaseous stream in the lumen side of the membrane. The gas inlet is connected to an air compressor or an oxygen supply line. The gaseous phase may consist of pure oxygen, air or other oxygen-containing mixtures. The hollow membrane fibers may be of various lengths and diameters and may be hydrophobic or hydrophilic. Non-porous silicone membranes may be utilized, however porous membranes may also be used depending on the particular application. A combination of experimental and theoretical considerations may be used to determine the membrane area required to satisfy the oxygen transfer requirements. A differential pressure is maintained across the membrane wall. The magnitude of the differential pressure, the partial pressure of oxygen in the gaseous phase and the concentration of the DO in the water side determine the amount of oxygen that diffuses across the membrane. The liquid and gas streams can flow countercurrent or co-current and the stream pressures can be adjusted according to the required oxygen transfer rates. In terrestrial applications, a headspace may be formed within the shell side of the membrane module without compromising the overall performance of the system. The operating differential pressure across the membrane wall is typically specified by the manufacturer.

Carbon removal, measured as COD or BOD5, and nitrification may also be performed in the same bioreactor which is separated into multiple sections. Since nitrification requires low COD concentration, in a first treatment stage or section, COD removal is performed. The treated water, low in COD (less than 50 mg/L), flows into a second section where nitrification occurs. The sections may be of different packing height and the nitrification bed may also contain alkalinity releasing compound such as marble chips. In this case the slower process, typically nitrification, controls the design specification of the bioreactor such as the hydraulic retention time and the recirculation ratio. After system start-up, the biofilm begins to develop in the packing surface. The thickness of the biofilm depends, among other things, on the flow regime within the packed portion of the reactor, the dynamics of the microbial communities and the availability of nutrients and oxygen in the surrounding medium. The biomass in the packed bed reaches a certain value and thereafter it remains constant over long periods of time. The system thus reaches an operating state, that is known to those familiar with the art as pseudo-steady-state. The amount of biomass produced is minimal and the system in terms of microbial growth is said to be at its stationary state. Microbial growth is roughly equal to microbial decay, thus, no net mass is generated. This is a major advantage of the attached growth system over a suspended growth counterpart, since sludge disposal requirements are almost eliminated. Moreover, since no biomass is deliberately wasted the sludge age, that is the retention time of the biological solids, in the system has theoretically an infinite value. This has a direct impact on the performance of the system in terms of BOD5 or nitrogen conversion because the biomass concentration in the system is directly related to the removal efficiency of the reactor. In general, the higher the biomass concentration, the higher the conversion efficiency. Another advantage of this system is resistance to toxic shocks and thus microbial wash-out, a condition resulting in complete loss of the biomass from the system and system failure. Mixing within the packed bed is achieved by the recirculation pump. This pump has its suction end in the top of the packed bed, it forces the wastewater through the oxygenation module and discharges it into the bottom flow distribution system of the bioreactor. The flow regime within the porous media is determined by the recirculation rate. At a recirculation ratio of between approximately 10 and 12 completely mixed flow conditions prevail. This advantage can greatly simplify the design and scale-up of the bioreactor since the completely mixed flow reactor equations are applicable. The pressure inside the bioreactor is controlled by pressure regulators installed on the liquid inlet, outlet and recirculation lines. This pressure, in turn, controls the DO concentrations and the rate of oxygen transfer in the wastewater. An advantage of the present invention is that the attached growth packed bed reactor produces a highly clarified effluent, low in suspended solids, so that no further clarification is required for many applications of the system.

In another embodiment, the present invention further provides a method for removing BOD5 and nitrogen from greywater under microgravity, hypogravity, or hypergravity conditions using the above described apparatus. According to the method, the wastewater is treated for carbon conversion or nitrification, or both, using the apparatus or system of the present invention. The wastewater is fed at a constant flow rate directly into the packed bed bioreactor. The bioreactor is fully saturated with the wastewater and maintained at the desired system pressure. No gaseous headspace is present in the bioreactor. The bioreactor housing the packed bed is fully saturated with the liquid to be treated. Neither the bioreactor nor the oxygenation module allow the liquid and the gaseous streams to come into direct contact with each other. Oxygen transfer occurs through the walls of a membrane which otherwise prevents mixing and direct contact of the two phases. The conversion of carbon-containing biodegradable substances to carbon dioxide and water proceeds through a series of mass transfer processes and biochemical reactions. The carbon substrates are transferred near the surface of the biofilm from the bulk of the liquid by diffusion processes and subsequently, by overcoming a series of resistances, are carried inside the biofilm where biodegradation takes place. The oxidation of carbon substrates results in the production of treated water.

The present invention is further exemplified by the following, non-limiting example.

EXAMPLE 1

Performance Data

Bioreactor systems were operated for periods ranging from a few months to over a year and performance was monitored. The process parameters and apparatus specifications for COD removal from a wastewater stream are summarized in Table 1. The reactor had a fully developed biofilm prior to the initiation of the wastewater treatment. The effluent COD profile indicates an average COD removal efficiency exceeding 90 percent. A 33% reduction in porosity, after 2 years of operation, due to biomass build up was observed. This reduction did not affect the overall performance of the bioreactor. The membrane oxygenator was found to provide sufficient DO to satisfy the demands of the carbon oxidation biochemical reactions occurring in the bioreactor.

The performance of the oxygenation module was also tested in a separate pilot scale study for nitrification of a high ammonia wastewater. The ammonia concentration in the bioreactor was approximately 350 mg/L. The oxygen pressure in gas side of the membrane module was 25 psig. The average DO concentration in the influent was approximately 27 mg/L and the average effluent DO was 7 mg/L. This resulted in an average ammonia conversion efficiency of 85% which was the target for the specific application.

TABLE 1

Operating and performance data for carbon conversion example.

| BIOREACTOR SPECIFICATIONS | |
| --- | --- |
| Diameter | 14 cm |
| Length | 25 cm |
| Packing | Plastic flakes |
| Packing Surface Area | 25 cm$^2$/gm |
| Porosity | 0.6 |
| MEMBRANE SPECIFICATIONS | |
| Length | 15 m |
| Inside diameter | 1.57 mm |
| Outside diameter | 2.41 mm |
| Surface area | 0.11 m$^2$ |
| OPERATING PARAMETERS | |
| Flow rate | 10 L/day |
| Hydraulic retention time | 6 hours |
| Flow recirculation ratio | 9 |
| Packed bed gauge pressure | 20 psi |
| Oxygenation modules gauge pressure water side | 22–24 psi |
| Oxygenation module gauge pressure oxygen side | 25 psi |
| PERFORMANCE DATA SUMMARY | |
| Influent COD range | 600–900 mg/L |
| Average organic loading rate | 1.91 kg COD m$^3$ · d |
| Average COD removal | 1.75 kg/m3 · d |
| Average BOD$_5$ removal | 1.50 kg/m$^3$ · d |
| Biomass yield | 0.1 g/g |
| Effluent TSS | 20 mg/L |
| Porosity Reduction | 33% |

A closed bioreactor can be operated, according to the present invention, to achieve high organic carbon removal and ammonia conversion in high-strength wastes in a single treatment unit. Organic carbon removal and ammonia conversion occur in the corresponding sections of the packed bed where the biofilm is formed. The oxygenation module enriches the recirculated water with oxygen which diffuses through a non-porous membrane into the agueous phase. The oxygen-enriched water is reintroduced into the packed bed section through the external recirculation loop. The bioreactor has a very low sludge production rate, producing a clarified effluent with low suspended solids and eliminating the need for a separate clarification unit. Operating the bioreactor as a closed unit at elevated pressures keeps the oxygen within the system in the dissolved phase, enhancing the availability of oxygen within the packed bed. The oxygen transfer within the reactor is thus much more efficient and uniform than in similar reactors having both a liquid and gaseous phase. Providing oxygen by diffusion through a non-porous membrane allows a high rate of oxygen transfer while minimizing the opportunity for the formation of bubbles. Since a high concentration of dissolved oxygen is maintained in the bioreactor, the pressurized system requires a smaller footprint than an ambient pressure system to achieve the same removal efficiency, making it more compact and economical. Since there is no gas-filled headspace, the bioreactor can be operated efficiently under microgravity conditions and in terrestrial environments.

Although the invention disclosed herein has been described with reference to particular embodiments, it is to be understood that these embodiments are merely illustrative of the principles and application of the present invention. It is therefore to be understood that numerous modifications may be made to the illustrative embodiments and that other arrangements may be devised without departing from the spirit and scope of the invention as defined by the appended claims.

What is claimed:

1. Apparatus for wastewater treatment, comprising:
   an immobilized-cell, packed-bed bioreactor;
   a recirculation line having an inlet and an outlet, each of which is fluidly connected to said bioreactor, said inlet being downstream of said outlet relative to the direction of flow of wastewater through said bioreactor; and
   an oxygenation module inline with said recirculation line, said oxygenation module having a non-porous membrane that separates a volume of gas that is outside of said recirculation line from a wastewater stream that is within said recirculation line so as to prevent mixing of the volume of gas and the wastewater stream.

2. The apparatus of claim 1, including means to move the volume of gas in a direction substantially parallel to said membrane.

3. The apparatus of claim 1, wherein said membrane is substantially impermeable to gases except by diffusion.

4. The apparatus of claim 3, wherein said membrane is selectively permeable to oxygen in preference to nitrogen.

5. The apparatus of claim 1, wherein said membrane is in the form of a plurality of tubular membranes.

6. The apparatus of claim 1, wherein said membrane in the form of gas-permeable fibers.

7. The apparatus of claim 1, wherein said membrane is a hydrophobic membrane.

8. The apparatus of claim 7, wherein said membrane comprises a silicone rubber material.

9. The apparatus of claim 1, wherein said bioreactor includes a first treatment section and a second treatment section.

10. The apparatus of claim 9, wherein said first treatment section is a biological oxidation section and said second treatment section is a nitrification section.

11. The apparatus of claim 1, wherein said inlet and said outlet of said recirculation line are fluidly connected to said first treatment section, said apparatus further comprising a second recirculation line having a second inlet and a second outlet, each of which is fluidly connected to said second treatment section, said second inlet being downstream of said second outlet relative to the direction of flow of wastewater through said second treatment stage; and a second oxygenation module inline with said second recirculation line.

12. A method for treating wastewater having an organic content, comprising the steps of:
   feeding a wastewater influent stream into an immobilized-cell, packed-bed bioreactor at a bioreactor inlet;
   removing a recycle stream from the bioreactor at a recycle outlet that is downstream of the bioreactor inlet relative to the direction of flow of the wastewater through the bioreactor;
   diffusing oxygen into the recycle stream through a membrane that separates the recycle stream from a volume of an oxygen-containing gas so as to prevent mixing of the recycle stream and the volume of oxygen-containing gas; and
   returning the recycle stream to the bioreactor upstream of the recycle outlet relative to the direction of flow of the wastewater through the bioreactor.

13. The method of claim 12, wherein the bioreactor is saturated with wastewater so that there is at most a negligibly small gas-phase volume within the bioreactor.

14. The method of claim 13, wherein the bioreactor is operated at a pressure sufficient to prevent the formation of gaseous bubbles within the bioreactor.

15. The method of claim 13, wherein the bioreactor is operated at a pressure greater than the partial vapor pressure of gases dissolved within the wastewater.

16. The method of claim 12, wherein the volume of gas is at least predominately composed of oxygen.

17. The method claim 12, wherein the volume of gas is a gas-phase stream, a predominate portion of which flows past said membrane.

18. The method of claim 12, wherein the volumetric flow rate of the influent stream is less than the volumetric flow rate of the recycle stream.

19. The method of claim 18, wherein the volumetric flow rate of the influent stream is less than about 10 percent of the volumetric flow rate of the recycle wastewater stream.

20. The method of claim 12, including the steps of biologically oxidizing the wastewater in a first section of the bioreactor and biologically nitrifying the wastewater in a second section of the bioreactor.

21. The method of claim 20, wherein the recycle outlet is upstream of the second section of the bioreactor, relative to the direction of flow of the wastewater in the first section of the bioreactor, and effluent from the first section of the bioreactor enters the second section of the bioreactor at a second inlet, the method further comprising the steps of:
   removing a second recycle stream from the second section of the bioreactor at a second recycle outlet that is downstream of the second inlet relative to the direction of flow of the wastewater through the bioreactor; and
   returning the second recycle stream to the second section of the bioreactor upstream of the second recycle inlet relative to the direction of flow of the wastewater through the second section of the bioreactor.

22. The method of claim 21, including the step of diffusing oxygen into the second recycle stream through a second membrane that separates the second recycle stream from a second volume of gas so as to prevent mixing of the second recycle stream and the second volume of gas.

* * * * *